United States Patent
Muroki

[15] 3,648,455
[45] Mar. 14, 1972

[54] SYSTEM FOR PURIFYING AN EXHAUST GAS FROM AN INTERNAL COMBUSTION ENGINE

[72] Inventor: Takumi Muroki, Hiroshima, Japan

[73] Assignee: Toyo Kogyo Company Limited, Aza-Shinchi, Fuchu-cho, Aki-gun, Hiroshima-Ken, Japan

[22] Filed: Mar. 13, 1970

[21] Appl. No.: 19,183

[30] Foreign Application Priority Data

Apr. 2, 1969 Japan..................................44/30207

[52] U.S. Cl...........................................................60/278
[51] Int. Cl...........................................................F01n 3/10
[58] Field of Search......................60/29, 30; 137/563, 569; 55/DIG. 30; 123/119 B

[56] References Cited

UNITED STATES PATENTS

| | | | |
|---|---|---|---|
| 3,115,873 | 12/1963 | Hahn | 123/119 B |
| 3,313,281 | 4/1967 | Schneider | 123/119 B |
| 3,392,523 | 7/1968 | Hyde | 60/30 |
| 3,397,534 | 8/1968 | Knowles | 60/30 |
| 3,430,437 | 3/1969 | Saussele | 60/30 |
| 3,433,242 | 3/1969 | Voorheis | 60/30 |

*Primary Examiner*—Douglas Hart
*Attorney*—Sughrue, Rothwell, Mion, Zinn & Macpeak

[57] ABSTRACT

A system for purifying exhaust gas from an internal combustion engine having an air cleaner, which system has a secondary air conduit for supplying secondary air from an air pump for combustion with the exhaust gas of the engine. An exhaust conduit means also extends from the secondary air conduit to the air cleaner for exhausting excess air, with the excess air being diffused against a buffer plated provided in the air cleaner to cool the air heated by the compression of the air pump.

5 Claims, 2 Drawing Figures

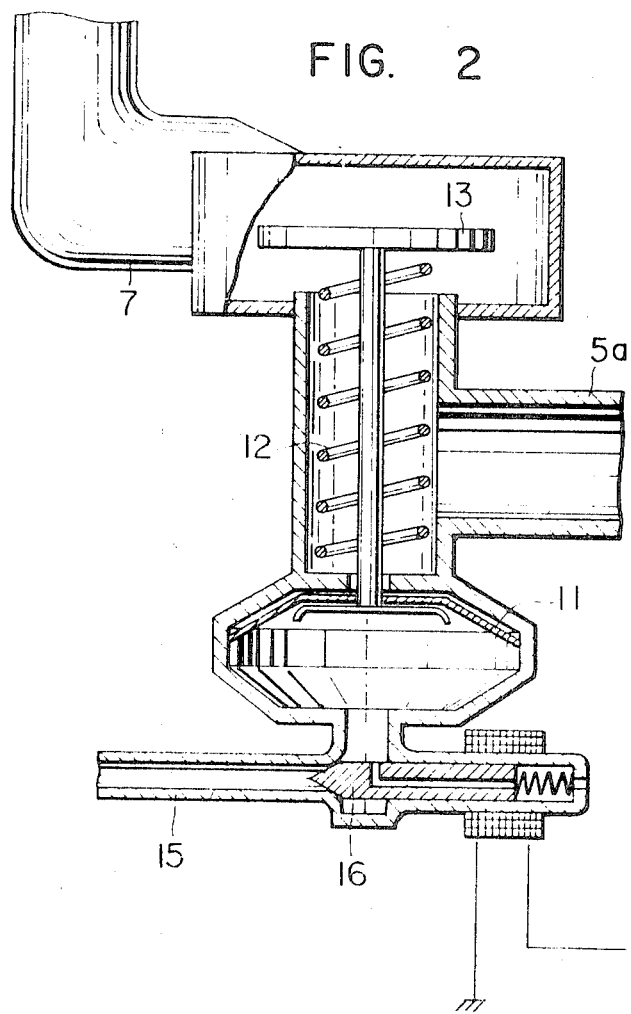

3,648,455

SYSTEM FOR PURIFYING AN EXHAUST GAS FROM AN INTERNAL COMBUSTION ENGINE

BACKGROUND OF THE INVENTION

1. Field of the Invention

This invention relates to an improvement of a system for purifying exhaust gas from an internal combustion engine, and more particularly to a system adapted to achieve a silencing effect by introducing into an air cleaner excess secondary air which is used for burning with the exhaust gas of the engine.

2. Description of the Prior Art

In order to prevent unburned poison gas which is included in the exhaust gas of an internal combustion engine from being exhausted to the atmosphere, prior art methods have completely burned the unburned component in the exhaust gas by injecting secondary air into the exhaust passage. In such cases, when the engine is running at high speed, the density of the unburned component of the exhaust gas becomes extremely diluted with the result that a recombustion by injection of the secondary air not required. Accordingly, the exhaust gas is exhausted without being injected with secondary air and the secondary air is exhausted through a relief valve means into the atmosphere. When such a quantity of secondary air is exhausted into the atmosphere, a considerably large noise is generated. In order to silence this noise, a silencer is provided in an opening portion of the relief valve means. However, these prior art silencers do not sufficiently silence the noise produced by such a quantity of secondary air.

SUMMARY OF THE INVENTION

This invention contemplates the elimination of the aforementioned disadvantages of the conventional systems for purifying exhaust gas from an internal combustion engine and provides a new and improved system for purifying the exhaust gas so as to produce a silencing effect by introducing excess secondary air into the air cleaner of the automobile engine against a buffer plate provided in the air cleaner to cool the air heated by the compression of the air pump.

BRIEF DESCRIPTION OF THE DRAWING

Other objects, advantages and features of the present invention will become apparent from the following description taken in conjunction with the accompanying drawings, in which:

FIG. 2 is a partial sectional view of the structure of this system.

DESCRIPTION OF THE INVENTION

Figure 1:
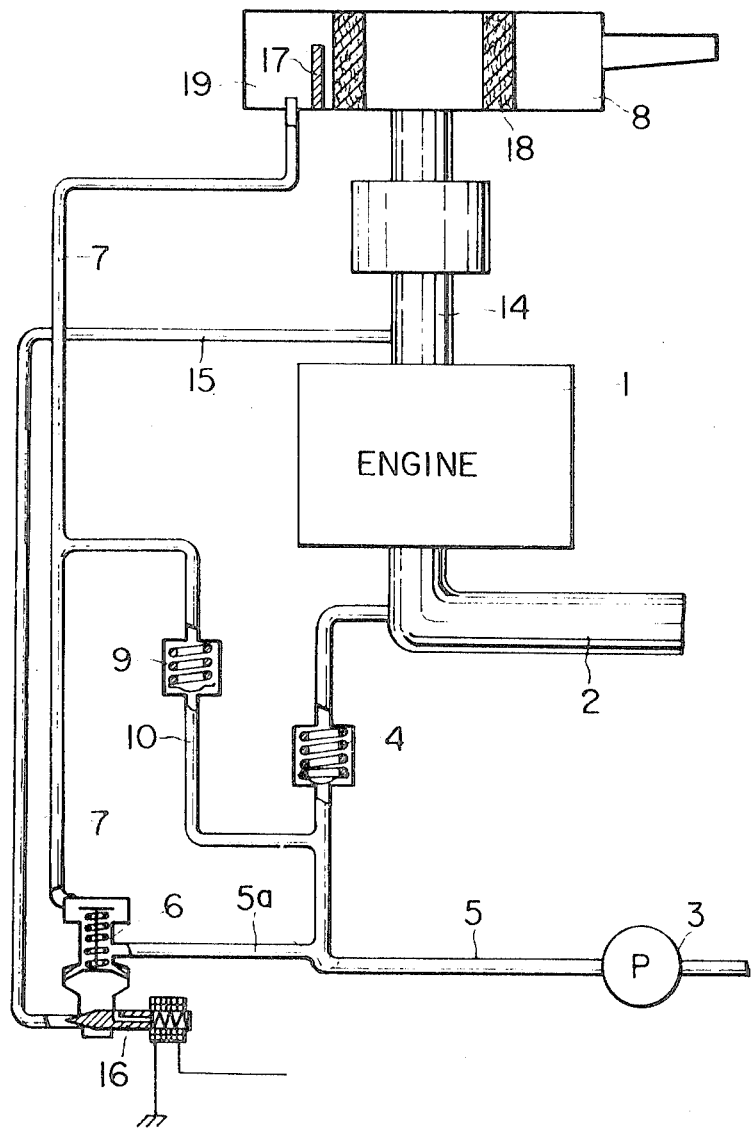
FIG. 1 is a schematic diagram of the system constructed in accordance with the present invention.

Reference is now made to the drawings, which shows one embodiment of the present invention.

Secondary air is fed from an air pump 3 into a secondary air conduit 5 and is injected through a check valve 4 for preventing a backfire into an exhaust passage 2 of the engine 1, for example, an exhaust port or an exhaust manifold, so that the unburned component of the exhaust gas is burned. An exhaust conduit means 5a for excess air extends from the secondary air conduit 5. The branch conduit 5a, from the secondary air conduit 5, is connected to a first relief valve means 6, the exhaust port of which communicates with the outside of a filter element 18 of an air cleaner 8 or unpurified air chamber 19 through an air conduit 7. The secondary air conduit 5 and the air conduit 7 are connected by a bypass conduit 10 provided with a second relief valve means 9 therein.

The second relief valve means 9 operates as a safety valve for preventing the pressure in the secondary air conduit 5 from becoming abnormally large. The first relief valve means 6 comprises a valve 13 connected to a diaphragm 11 and urged to an open position by a spring 12. The lower portion of the diaphragm 11 is connected to a vacuum-generating portion of the engine 1 intake passage 14 by a vacuum conduit 15.

A solenoid valve 16, operated by an engine speed detecting device (now shown), is located in the vacuum conduit 15. This solenoid valve 16 closes the vacuum conduit 15 when the engine speed exceeds a predetermined value and opens the conduit 15 when the engine speed falls below a predetermined value.

During the idling and low-speed operation of the engine, the vacuum conduit 15 is opened by the solenoid valve 16 to thereby lower the valve 13 as a result of the vacuum of the engine intake passage 14 so as to close the air conduit 7. Accordingly, the secondary air which is compressed in the secondary air conduit 5 is then injected into the exhaust passage 2 by urging the check valve 4 to open position. When the air pressure of the secondary air passage 5, branch conduit 5a, and bypass conduit 10 exceeds a predetermined value at high speed, the solenoid valve 16 operates in cooperation with the engine speed detecting device to shut off the vacuum conduit 15. Accordingly, since the vacuum operating on the lower portion of the diaphragm 11 is eliminated, the valve 13 is pushed upward by the tension of the spring 12 so as to open the branch conduit 5a to the air conduit 7. The secondary air from the air pump 3 is then introduced through the branch conduit 5a and the air conduit 7 into the air cleaner 8 with the result that the secondary air is not injected into the exhaust passage 2. Since the air cleaner 8 has a large capacity, noise does not occur and a good silencing effect results even if a large quantity of secondary air is introduced. If the secondary air is exhausted into the unpurified portion of air chamber 19 as this embodiment discloses, the system will be effective even if any devices in the secondary air system are themselves defective and the secondary air will not be introduced into the engine. If a buffer plate 17 is provided in the air cleaner 8, the airstream is diffused so that the air heated by the compression of the air pump 3 is cooled. Accordingly, the disadvantage of an increase in the temperature of the air fed into the carburetor by the introduction of the secondary air into the air cleaner 8 does not occur.

In this embodiment, the first relief valve means 6 is operated to open or close with the diaphragm 11 by means of the solenoid valve 16 operating in response to the engine speed. However, this first relief valve means 6 may be operated to open or close in response to the engine load, engine temperature, exhaust gas or vehicle speed of the automobile.

In accordance with the present invention because the excess secondary air is not required to be injected into the exhaust passage 2 but is exhausted to the air cleaner 8, a silencing effect is achieved without the necessity of elaborate structure.

What is claimed is:

1. A system for purifying the exhaust gas from an internal combustion engine having an air cleaner, comprising a secondary air conduit connected at one end to an air pump and at the other end to an exhaust passage of the engine to thereby supply secondary air for combustion with exhaust gas, an excess air exhaust conduit means connected to said secondary air conduit for exhausting the excess air, an exhaust outlet on said exhaust conduit means opening into said air cleaner, and a buffer plate provided in said air cleaner adjacent said exhaust outlet whereby the airstream exhausted from said outlet is diffused against the buffer plate to lower the exhaust noise and the temperature thereof.

2. A system according to claim 1, wherein said buffer plate is provided in an unpurified air chamber in said air cleaner and said exhaust outlet is opened to said unpurified air chamber.

3. A system according to claim 2, wherein a check valve means is provided in said secondary air conduit and a relief valve means is provided in said excess air exhaust conduit means.

4. A system according to claim 3, wherein said relief valve means comprises a first relief valve assembly and a second relief valve assembly, said first relief valve assembly controlled by an engine speed detecting means for detecting the engine speed, said first relief valve assembly being opened to bypass the supply of the secondary air from said exhaust passage of the engine to said excess air exhaust conduit when the engine speed detected by said engine speed detecting means exceeds a predetermined value, and said second relief valve assembly opened to release the air in said secondary air conduit into said excess air exhaust conduit when the air pressure in said secondary air conduit exceeds a predetermined value.

5. A system according to claim 4, wherein said first relief valve assembly further comprises a diaphragm-actuating means operatively connected to an inlet manifold of said engine, each diaphragm-actuating means operating in response to the vacuum in said inlet manifold of the engine to selectively open and close said first relief valve means, and said engine speed detecting means actuating said first valve assembly to shut off the vacuum acting on said diaphragm-actuating means when the engine speed exceeds said predetermined value.

* * * * *